United States Patent Office 3,378,489
Patented Apr. 16, 1968

3,378,489
PROCESS FOR TREATING A SODIUM CHLORIDE BRINE TO INHIBIT PRECIPITATION OF SODIUM CHLORIDE FROM SAID BRINE
Reginald M. Lasater, Duncan, Okla., assignor to Halliburton Company, Duncan, Okla., a corporation of Delaware
No Drawing. Continuation-in-part of application Ser. No. 303,175, Aug. 19, 1963. This application May 9, 1967, Ser. No. 637,055
7 Claims. (Cl. 252—8.55)

ABSTRACT OF THE DISCLOSURE

Processes and compositions for inhibiting the precipitation of sodium chloride. Compositions comprising phosphate-containing materials in combination with compositions capable of modifying sodium chloride such that the phosphate materials are capable of effectively inhibiting the precipitation thereof. The composition capable of modifying sodium chloride such that the phosphate materials are capable of effectively inhibiting precipitation thereof is selected from the group consisting of urea, certain natural gums, metal diphenylamine sulfonates, di-beta napthol and mixtures thereof.

---

This application is a continuation-in-part of Ser. No. 303,175, filed Aug. 19, 1963, now abandoned, the disclosure of which is expressly incorporated hereby by reference.

BACKGROUND OF INVENTION

Precipitation of sodium chloride is a troublesome problem in many environments where water having high concentrations of sodium chloride must be handled. For example, many oil producing formations also produce substantial amounts of water containing high concentrations of sodium chloride. Such water is often referred to as brine. There is a pronounced tendency for the sodium chloride to precipitate from such solutions. Such precipitation usually occurs when a small amount of water is evaporated or when the solution is allowed to cool.

This precipitation is extremely undesirable since it causes deposits which build up in conduits and in the formation itself. Such deposits often severely interfere with the flow of oil being produced from the formation. The permeability of the formation may be so impaired as to require abandonment of the well.

In general, treating with fresh water has been used to remove sodium chloride deposits. However, such treatment is quite impractical when only a limited amount of fresh water is available or when the ambient temperature is below the freezing point of the water. Since a large number of oil producing formations are located in areas where only small amounts of fresh water are readily available, it has often been very expensive and economically unattractive to perform fresh water treatments. Furthermore, it has been found that polyphosphate compositions which are often effective in inhibiting the precipitation of certain salts, e.g., calcium carbonate, have little or no effect on the precipitation of sodium chloride.

SUMMARY OF INVENTION

Briefly, the compositions of the present invention comprise polyphosphates in combination with compositions capable of modifying sodium chloride such that the polyphosphates are capable of effectively inhibiting the precipitation thereof, and selected from the group consisting of urea, natural gums such as gum arabic, copal gum, myrrh gum, gum tragacanth, catechu gum, and kauri gum, metal diphenylamine sulfonates such as barium diphenylamine sulfonate, other alkaline earth metal diphenylamine sulfonates, and the like, and di-beta-naphthol and mixtures thereof. Polyphosphates may be considered polymetallic substitution products of phosphoric acids, e.g., orthophosphoric acid, wherein some hydrogen atoms have been replaced by at least one metal, usually an alkali metal or an alkaline earth metal to form complex macromolecules containing, e.g., metaphosphate groups. Mixed polyphosphates may be prepared by reacting the phosphoric acid with more than one metallic hydroxide, e.g., calcium magnesium, potassium and/or lithium hydroxides to form sodium magnesium polyphosphate, sodium calcium polyphosphate, sodium calcium magnesium polyphosphate and the like. Included among the polyphosphates which may be used in the present invention are sodium hexametaphosphate, sodium tripolyphosphate, sodium pyrophosphate, sodium trimetaphosphate and sodium tetrametaphosphate. Thus, it is to be understood that a wide variety of metallic polyphosphates may be used in the present invention.

Therefore, it is a primary object of the present invention to provide compositions and processes for effectively inhibiting the precipitation of sodium chloride.

It is another object of the present invention to provide compositions comprising phosphate-containing materials in combination with compositions capable of modifying sodium chloride such that the phosphate materials are capable of effectively inhibiting the precipitation thereof and processes for using these compositions.

Other objects and advantages of the present invention, it is believed, will be apparent from the following detailed description of specific embodiments thereof.

DESCRIPTION OF PREFERRED EMBODIMENTS

It has been found that when these compositions are combined with polyphosphates, the precipitation of sodium chloride may be effectively inhibited. The best weight ratio of polyphosphate to the composition capable of modifying sodium chloride varies widely, and depends upon the particular chemical employed. Given the concept of the present invention, only routine experimentation is required to determine the relative amounts of polyphosphate and composition capable of modifying sodium chloride which should be used. The weight ratio of polyphosphate to said composition normally falls within the range of from about 0.02 to 50.0. In general, it has been found that 0.1% sodium hexametaphosphate in combination with 0.1% of one of the natural gums previously described in a saturated sodium chloride solution will effectively inhibit precipitation. Similarly, 10% urea in combination with 0.5% sodium hexametaphosphate will also function effectively as will 0.1% sodium hexameta-phosphate in combination with a saturated solution (in salt water) of barium diphenylamine sulfonate or di-beta-naphthol. Mixtures of these compounds may also be employed, e.g., 0.05% barium diphenylamine sulfonate, 0.1% gum arabic and 0.1% sodium hexametaphosphate or 15% urea, 0.1% gum arabic and 0.1% sodium hexametaphosphate.

Although the present invention is not to be considered to be limited to any particular mechanism, it is hypothesized that polyphosphates alone do not inhibit the precipitation of sodium chloride because the structure of the sodium chloride is such that the polyphosphate cannot combine therewith, e.g., by adsorption. It is believed that the compounds used in combination with polyphosphates according to the present invention are adsorbed by the sodium chloride and function to render the sodium chloride receptive to combination with the polyphosphate, thereby inhibiting precipitation. It is believed that the sodium chloride crystal structure is altered such that it is capable of combining with the polyphosphate. However, it would also appear that the urea, natural gums and other organic materials used according to this invention are adsorbed by the sodium chloride thereby imparting to the sodium chloride crystal a surface which is organic in nature. Thus, the polyphosphate could combine with the sodium chloride by chemical reaction, complex formation, electrostatic attraction, adsorption or some other mechanism.

The present invention is further illustrated by the following examples.

Example 1

Various additives were introduced into a saturated sodium chloride solution and allowed to stand uncovered overnight (approximately 15 hours). It was expected that normal evaporation of the water would cause the salt to precipitate. A control sample containing no additive was also included as part of this test. It was found that a considerable amount of salt separated in the control sample. In addition, a moderate amount of salt precipitated in a sample containing 15% by weight urea and in a sample containing 0.5% by weight sodium hexametaphosphate.

Solutions containing 0.5% sodium hexametaphosphate plus varying amounts of urea were also tested. In such solutions containing 1% and 5% urea, a moderate amount of salt precipitated. However, in a solution containing 10% urea, very little salt precipitated and in a solution containing 15% urea, no salt separated.

Thus, this example establishes that when 0.5% sodium hexametaphosphate is used in combination with at least 10% urea, precipitation of sodium chloride is effectively inhibited.

Example 2

A test similar to that described in Example 1 was made in which solutions containing 0.1% sodium hexametaphosphate plus 0.1% of various natural gums were used. The results of these tests are indicated in the following table.

TABLE 1

| Additive: | Effect |
|---|---|
| Gum arabic | Very little salt precipitated. |
| Copal gum | Slight amount of salt precipitated. |
| Myrrh gum | Do. |
| Gum tragacanth | Do. |
| Catechu gum | Do. |
| Kauri gum | Slight amount of salt separated. |

Thus, this example establishes that 0.1% sodium hexametaphosphate in combination with 0.1% of the natural gums set forth in Table 1 function to effectively inhibit precipitation of sodium chloride.

Example 3

Saturated sodium chloride solutions containing 0.1% sodium hexametaphosphate in combination with each of a saturated solution of barium diphenylamine sulfonate and a saturated solution of di-beta-naphthol in salt water were tested as described in Example 1. In each case, very little salt separated. Thus, it is apparent that these compositions will effectively inhibit the precipitation of sodium chloride.

Example 4

In this example, two mixtures were used. In each case, the composition of the mixture is expressed in percent by weight in a saturated sodium chloride solution. The first mixture comprised 0.05% barium diphenylamine sulfonate, 0.1% hexametaphosphate and 0.1% gum arabic. The second mixture comprises 15% urea, 0.1% sodium hexametaphosphate and 0.1% gum arabic. These solutions were tested as described in Example 1. In each case, very little salt precipitated. Thus, these compositions functioned to effectively inhibit the precipitation of sodium chloride.

It will be readily apparent to those skilled in the art that the compositions of the present invention may be used to inhibit the precipitation of sodium chloride in all environments where such precipitation is undesirable. For example, the compositions of the present invention may be introduced into oil producing formations. For downhole treatment, it is preferred to lubricate the compositions of the present invention to the bottom of the well. The compositions of the present invention are also useful in preventing salt deposition in the preheater tubes and reflux towers of gas recycling plants. In such plants, a substantial amount of salt is often carried by the crude oil which is processed. Ordinarily, fresh water is metered into the oil to dissolve the salt and the fluids are heated to 250° F. In the preheater and then moved to the tower where the temperature is raised to about 350° F. Salt is deposited as water is evaporated at these high temperatures. It has been found that this salt deposition may be prevented by adding the compositions of the present invention to the water used in the oil.

The compositions of the present invention may also be used as additives to the fluids introduced into injection wells. As is well known to those skilled in the art, the fluids introduced into such injection wells function as driving fluids which cause oil to be produced from producing wells. Water is frequently used as the driving fluid. However, such wells have often functioned unsatisfactorily because of sodium chloride precipitation. The present invention substantially eliminates this difficulty.

It should also be understood that the polyphosphates present in the compositions of the present invention will inhibit the precipitation of calcium, magnesium, barium, iron and other salts. Thus, the present invention provides a precipitation inhibitor which is applicable to a wider spectrum of salts than the polyphosphate materials previously available. Furthermore, it should be understood that it is to be expected that compositions other than those specifically described herein will have the property of being capable of modifying sodium chloride such that the precipitation of sodium chloride may be effectively inhibited by polyphosphates. For example, it is to be expected that certain synthetic gums will have this property. All such subsequent developments are to be considered within the scope of this invention.

Having fully described the present invention, it is to be understood that it is not to be limited to the specific details set forth, but is of the full scope of the appended claims.

I claim:

1. A process of treating a sodium chloride brine solution comprising adding to said solution a metal polyphosphate and a composition capable of modifying said sodium chloride, such that said polyphosphate is capable of substantially inhibiting the precipitation of said sodium chloride under conditions such that there would be substantial precipitation of sodium chloride in the absence of said metal polyphosphate and said composition, said phosphate selected from the group consisting of alkali metal polyphosphates, alkaline earth metal polyphosphates, alkali-alkaline earth metal polyphosphates and mixtures thereof, and said composition selected from the group consisting of gum arabic, copal gum, myrrh gum, gum tragacanth, catechu gum, kauri gum, barium diphenylamine sulfonates, di-beta-naphthol and mixtures thereof, the weight ratio of said polyphosphate to said composition being from about 0.02 to 50.0.

2. A process of treating a subterranean well containing a sodium chloride brine solution having a sodium chloride concentration near the saturation point comprising introducing into said well a polyphosphate and a composition capable of modifying sodium chloride such that said polyphosphate is capable of effectively inhibiting the precipitation of said sodium chloride under conditions such that there would be substantial precipitation of sodium chloride in the absence of said composition, said phosphate selected from the group consisting of alkali metal polyphosphates, alkaline earth metal polyphosphates, alkali-alkaline earth metal polyphosphates and mixtures thereof, and said composition selected from the group consisting of gum arabic, copal gum, myrrh gum, gum tragacanth, catechu gum, kauri gum, barium diphenylamine sulfonates, di-beta-naphthol and mixtures thereof, the weight ratio of said polyphosphate to said composition being from about 0.02 to 50.0.

3. A process of treating a subterranean formation containing a sodium chloride brine solution having a sodium chloride concentration near the saturation point comprising injecting into the formation a polyphosphate and a composition capable of modifying said sodium chloride such that said polyphosphate is capable of effectively inhibiting precipitation of said sodium chloride under conditions such that there would be substantial precipitation of sodium chloride in the absence of said composition, said phosphate selected from the group consisting of alkali metal polyphosphates, alkaline earth metal polyphosphates, alkali-alkaline earth metal polyphosphates and mixtures thereof, and said composition selected from the group consisting of gum arabic, copal gum, myrrh gum, gum tragacanth, catechu gum, kauri gum, barium diphenylamine sulfonates, di-beta-naphthol and mixtures thereof, the weight ratio of said polyphosphate to said composition being from about 0.02 to 50.0.

4. The process of claim 3 wherein said phosphate is hexametaphosphate and said composition is gum arabic.

5. The process of claim 4 wherein said phosphate and said gum arabic are present in substantially equal amounts.

6. A composition consisting essentially of urea, sodium hexametaphosphate and gum arabic, said urea, sodium hexametaphosphate and gum arabic being present in relative amounts sufficient to modify sodium chloride and inhibit sodium chloride precipitation, said urea being present in an amount of at least about twenty times the amount of said phosphate and said gum arabic being present in an amount substantially equal to that of said phosphate.

7. A composition consisting essentially of a barium diphenylamine sulfonate, sodium hexametaphosphate and gum arabic, said sulfonate, phosphate and said gum arabic being present in relative amounts sufficient to modify sodium chloride and inhibit sodium chloride precipitation, said phosphate being present in an amount of about two times that of said sulfonate and said gum arabic being present in an amount substantially equal to that of said phosphate.

References Cited
UNITED STATES PATENTS

| | | | |
|---|---|---|---|
| 2,280,996 | 4/1942 | Booth | 252—8.5 |
| 2,452,021 | 10/1948 | Wayne | 252—8.5 |
| 2,764,242 | 9/1956 | Rohrback et al. | 252—8.5 |
| 2,908,597 | 10/1959 | Owen | 252—8.5 |
| 3,213,017 | 10/1965 | Ralston | 252—8.55 |

LEON D. ROSDOL, *Primary Examiner.*

HERBERT B. GUYNN, *Examiner.*